United States Patent
Ching et al.

(10) Patent No.: US 12,240,151 B2
(45) Date of Patent: Mar. 4, 2025

(54) COMPOSITE STRUCTURE WITH BLIND HOLE

(71) Applicant: Goodrich Corporation, Charlotte, NC (US)

(72) Inventors: Nathaniel Ching, Hartville, OH (US); Jin Hu, Hudson, OH (US); Wenping Zhao, Glastonbury, CT (US); Casey Slane, Tallmadge, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 1194 days.

(21) Appl. No.: 16/672,667

(22) Filed: Nov. 4, 2019

(65) Prior Publication Data

US 2020/0215725 A1    Jul. 9, 2020

Related U.S. Application Data

(60) Provisional application No. 62/789,303, filed on Jan. 7, 2019.

(51) Int. Cl.
| | | |
|---|---|---|
| *B29C 33/52* | (2006.01) | |
| *B29C 33/00* | (2006.01) | |
| *B29C 70/00* | (2006.01) | |
| *B29C 70/46* | (2006.01) | |
| *B29K 307/04* | (2006.01) | |
| *B29K 309/08* | (2006.01) | |
| *B29L 31/00* | (2006.01) | |

(52) U.S. Cl.
CPC .......... *B29C 33/52* (2013.01); *B29C 33/0033* (2013.01); *B29C 70/46* (2013.01); *B29K 2307/04* (2013.01); *B29K 2309/08* (2013.01); *B29K 2995/0062* (2013.01); *B29L 2031/7156* (2013.01)

(58) Field of Classification Search
CPC ..... F17C 2201/0171; B29L 2031/7172; B29L 2031/7156; B29L 2022/007
See application file for complete search history.

(56) References Cited

U.S. PATENT DOCUMENTS 5,368,467 A * 11/1994 Kleyn ................... B29C 33/442
                                                    264/318
5,577,630 A * 11/1996 Blair ....................... F17C 1/16
                                                    220/586
6,095,367 A    8/2000 Blair et al.
(Continued)

FOREIGN PATENT DOCUMENTS

DE    102008013759 A1    9/2009
FR         2739912 A1    4/1997
WO    WO2017184170 A1   10/2017

OTHER PUBLICATIONS

Extended European Search Report for EP Application No. 19215373.2, Dated May 26, 2020, pp. 6.

*Primary Examiner* — Alison L Hindenlang
*Assistant Examiner* — Andres E. Behrens, Jr.
(74) *Attorney, Agent, or Firm* — Kinney & Lange, P. A.

(57) ABSTRACT

A method of making a blind hole in a wall of a multi-section tank during manufacture includes inserting a thin, flexible composite spacer ring in a hole in a composite material between mating parts of a soluble tool. The composite spacer ring is cured to the composite material during curing and maintains the hole between sections of the tank once completed.

19 Claims, 5 Drawing Sheets

(56) References Cited

U.S. PATENT DOCUMENTS

| | | | | |
|---|---|---|---|---|
| 6,220,779 B1* | 4/2001 | Warner | ................ | B65D 88/005 |
| | | | | 220/684 |
| 9,068,464 B2 | 6/2015 | Morrison et al. | | |
| 9,347,610 B1 | 5/2016 | Rufer et al. | | |
| 10,222,001 B2* | 3/2019 | Croteau | .................. | F17C 13/06 |
| 2007/0176323 A1* | 8/2007 | Jones | .................... | B29C 70/541 |
| | | | | 425/417 |
| 2018/0290334 A1* | 10/2018 | Corsmeier | ............ | F01D 25/005 |
| 2018/0290391 A1* | 10/2018 | Corsmeier | ............ | B29C 70/345 |
| 2018/0291750 A1 | 10/2018 | Corsmeier | | |
| 2019/0086030 A1* | 3/2019 | Zhao | .................... | B29C 69/007 |
| 2022/0023913 A1* | 1/2022 | Hu | ........................... | F17C 1/10 |

* cited by examiner

COMPOSITE STRUCTURE WITH BLIND HOLE

CROSS-REFERENCE TO RELATED APPLICATION(S)

This application claims the benefit of U.S. Provisional Application No. 62/789,303 filed Jan. 7, 2019 for "COMPOSITE STRUCTURE WITH BLIND HOLE" by N. Ching, J. Hu, W. Zhao and C. Slane.

BACKGROUND

The present disclosure relates to composite fluid vessels. More specifically, the present disclosure relates to composite, high-pressure fluid vessels for use in aircraft potable water systems.

Aircraft potable water systems supply drinkable water throughout an aircraft for various uses. Aircraft potable water systems typically include many parts, including but not limited to: fluid vessels, hydraulic pumps, fluid heaters, control valves, and hydraulic fluid line tubing. The fluid vessels used for aircraft potable water vessels are generally pressurized and must maintain their shape while under internal pressure.

Many fluid vessels for aircraft potable water systems contain multiple sections. Typically, the sections are formed through the use of tools having two removable mating parts, around which a composite (or other appropriate section material) is cured.

Blind holes between adjacent sections are required in many fluid vessels for flow of fluid within the whole vessel. For this reason, holes should be made in walls shared by adjacent sections during manufacture of the fluid vessel. Generally, a boss is used to create a hole in the wall shared by the sections. The boss must seal on both mating parts of the tool to keep the hole open through the curing process. The boss is then removed. However, if the tool is soluble or collapsible, it is difficult to create a boss that seals well and comes out cleanly after curing. Alternatively, machining a hole post-manufacturing is cost prohibitive.

SUMMARY

In one embodiment, a method of making a multi-section tank includes aligning two mating sections of a soluble tool, applying a composite material between the two mating sections, composite material having a hole, placing a spacer in the central hole, curing the composite material and the spacer around the soluble tool, such that the spacer adheres to the composite material, and washing out the soluble tool to form a blind hole between mating sections of the tank.

In another embodiment, an apparatus includes a soluble tool having a first mating part with an indent and a second mating part with an indent, the second mating part aligned with the first mating part; a composite layer between the first mating part and the second mating part, the composite layer comprising a central opening; and a spacer residing in and conformed to the central opening.

DETAILED DESCRIPTION

When fluid vessels, such as tanks, are made with multiple sections, blind holes between sections can be made during manufacture of the tank itself by the creation of a hole through the shared wall, rib, or baffle located between sections. A thin, flexible composite spacer is inserted into the composite layer and cured into the assembly, allowing the creation of a blind hole without a boss or later machining.

Figure 1:
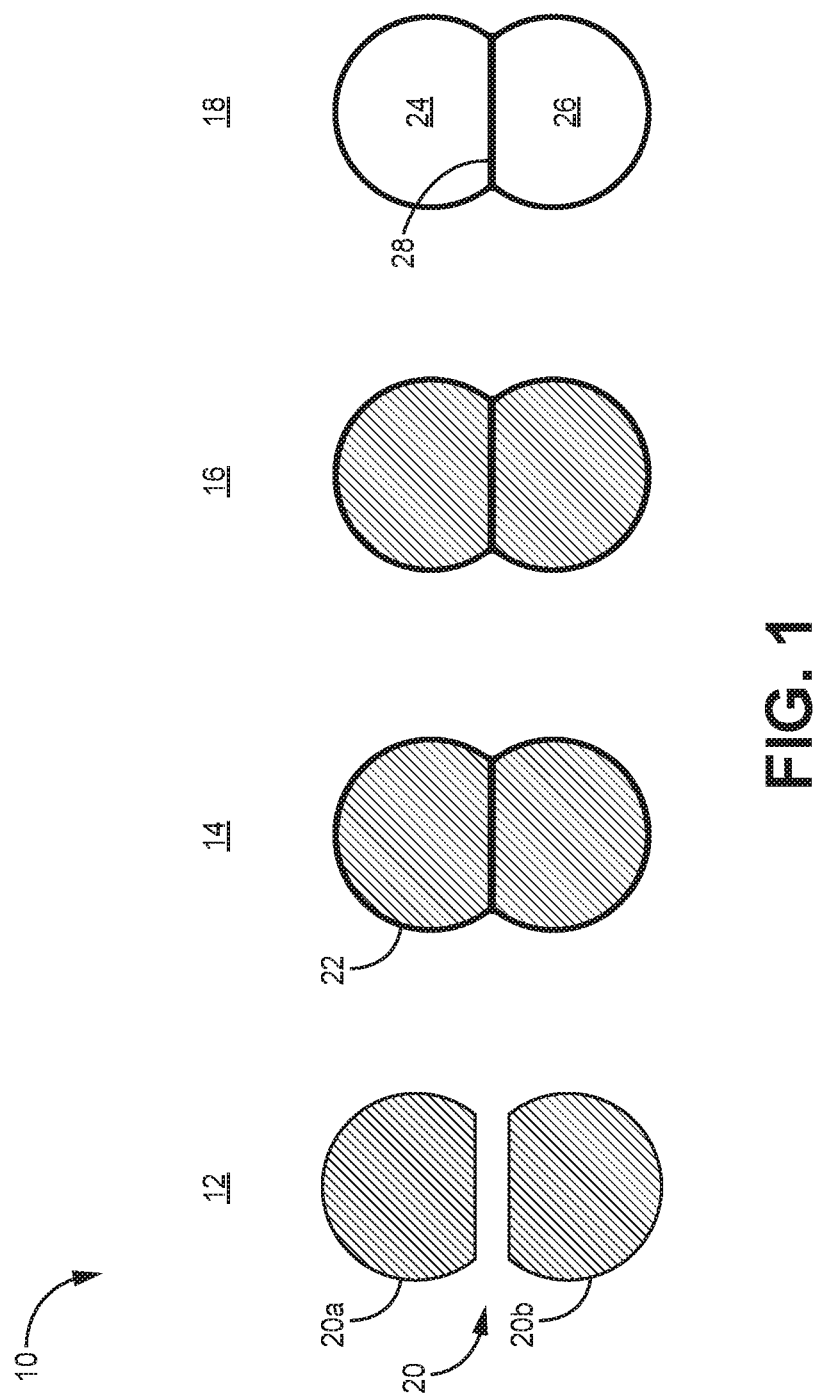
FIG. 1 is a schematic flow chart of a method of a build process for making a multi-section tank.

FIG. 1 is a schematic flow chart of a method of a build process for making a multi-section tank. Method 10 in FIG. 1 shows steps 12 to 18, with soluble tool 20, composite material 22, sections 24, 26, and shared wall 28.

First, in step 12, a soluble tool 20 is aligned. Soluble tool 20 has mating parts 20a and 20b, which are each of the desired size and shape corresponding to a finished section of the multi-section tank. Mating parts 20a, 20b are made to align with each other, and are oriented as such. Soluble tool 20 is made of a salt, AquaCore® washout mandrel material, or any comparable material which can later in the process be easily removed.

Next, in step 14, composite material 22 is added around soluble tool mating parts 20a, 20b. Soluble tool 20 is enclosed with composite material 22. Pressure washing and vibrating the tank can be used to aid in breaking up and removing soluble tool 20. A layer of composite material 22 is inserted between soluble tool mating part 20a and mating part 20b. The composite material can be, for example, a pre-impregnated matrix having a resin and fibers. The resin can be, for example, a polymer such as a thermoplastic or thermoset, or other material appropriate in the art. The fiber can be a fiber glass, carbon allotrope, or other material as appropriate in the art.

In step 16, the composite material 22 is cured around soluble tool 20. The composite material 22 cures to the shape of soluble tool 20 mating parts 20a, 20b, and in particular cures to create both external walls defining sections 24, 26 and shared wall 28. The composite material 22 can be cured, for example, in an autoclave at a range between 200 and 400 degrees Fahrenheit, with pressure between a vacuum bag (atmospheric pressure on the outside and up to 29 inches mercury inside) and 100 psi autoclave pressure. Generally, the curing process can take between 2 and 6 hours.

Finally, in step 18, soluble tool 20 is washed out. This can be done by washing with water or other solvent capable of removing the soluble tool 20 without chemically reacting with composite material 22. This results in a multi-section, composite material tank with shared wall 28. To create a blind hole between sections 24 and 26, tool 20 should be configured to create a hole as described with reference to FIGS. 2-3 below.

Figure 2:
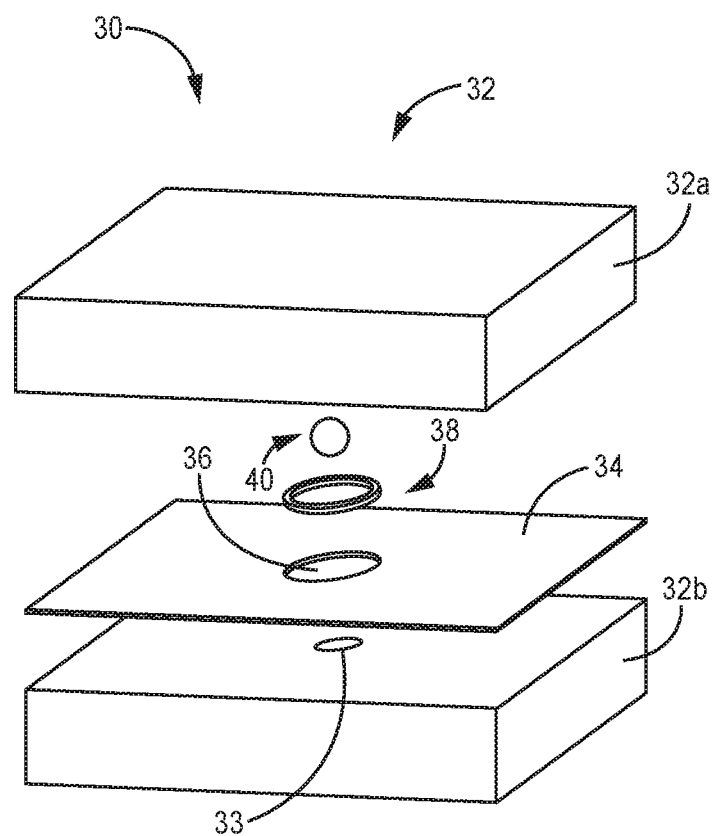
FIG. 2 is an exploded view of a tool for creating blind holes in a tank section.

FIG. 2 is an exploded view of assembly 30 for creating tank sections with a blind hole. Assembly 30 includes soluble tool 32, which includes mating parts 32a and 32b, composite layer 34 with opening 36, spacer 38, and bearing 40.

Soluble tool 32 has mating parts 32a and 32b. Soluble tool 32 is in the shape of sections for a tank, with each mating parts 32a and 32b being in the size and shape of a tank section. Composite layer 34 is aligned between mating parts 32a and 32b to form a wall between tank sections, or alternatively a baffle or rib depending on the tank design.

Mating parts 32a and 32b are made of a salt, a ceramic with a water soluble polymer binder (such as Aquacore® washout mandrel material), or comparable material that dissolves away after the tank sections, made of a composite, are cured together. Soluble tool 32 has indents 33 to align spacer 38 and bearing 40.

Composite layer 34 is a portion of a composite material which the tank will be made of, located between two sections of the tank. Composite layer 34 can be, for example, a pre-impregnated matrix having a resin and fibers. The resin can be, for example, a polymer such as a thermoplastic or thermoset, or other material appropriate in the art. The fiber can be a glass fiber, carbon allotrope, or other material as appropriate in the art.

Composite layer 34 contains opening 36, which will serve as a hole between sections of the completed tank. Spacer 38 is a ring (or other shape as described below with reference to FIGS. 3A-3C) that fits into opening 36 and cures to the composite layer 34. Spacer 38 ensures composite layer 34 does not close around opening 36 when cured. However, spacer 38 must be able to collapse to some degree to seal against the mating tool. The spacer 38 must also have in-plane rigidity to keep its shape during the build of the multi-section tank. Spacer 38 can be, for example, a composite material that will cure with composite layer 34 but maintain its shape to allow for opening 36.

Spacer 38 is generally no thicker than composite layer 34 to prevent misalignment of the soluble tool 32, or spacer 38 is pliant such that it thins to the height of composite 34 when pressure is applied. Preferably, spacer 38 is made of a material with a coefficient of thermal expansion (CTE) close to that of composite layer 34.

Alternatively, spacer 38 can be a thick paste instead of a shaped ring that cures at a different rate (i.e., faster) than the composite at a low temperature. In this case, spacer 38 would cure first, and maintain its shape as composite 34 cures around spacer 38.

In some embodiments, bearing 40 lies within spacer 38. Bearing 40 can be, for example, a ball bearing that moves within spacer 38. In FIG. 2, ball bearing 40 is aligned with indents 33 in soluble tool 32 such that soluble tool 32a and soluble tool 32b are aligned. Alternatively, bearing 40 can be a cylinder, pin, flattened disk, or other shape that allows for alignment of soluble tool 32a with regards to soluble tool 32b. Bearing 40 can be any hard material that does not break apart during the manufacture of assembly 30, for example acetal, nylon, acrylic, aluminum, or stainless steel. The diameter of bearing 40 must be larger than the thickness of spacer 38 or wall 34 to serve its purpose as an alignment. Bearing 40 can also be made of a soluble material such as salt or Aquacore®, provided that the soluble material is strong and hard enough to resist breaking during manufacture of assembly 40.

When soluble tool 32 in FIG. 2 is aligned and composite layer 34 is cured (as in step 16 of FIG. 1), spacer 38 and bearing 40 ensure that a hole is formed in the wall between sections of the tank. Thus, spacer 38 and bearing 40 allow for creation of a blind hole during manufacture of a multi-section tank. Once the soluble tool 32 is washed out (as in step 18 of FIG. 1), bearing 40 can be likewise removed. The bearing 40 is designed to that it is small enough to roll out of the trapped area. The spacer 38 is cured to the internal wall and left in the tank.

Figure 3A:
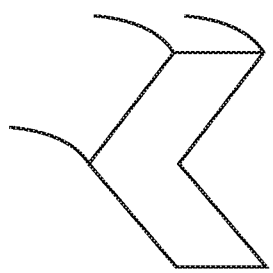
FIGS. 3A-3C are schematic views of spacers in different embodiments for use in creating blind holes in a tank section.
Figure 3B:
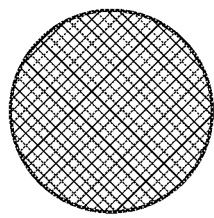
Figure 3C:
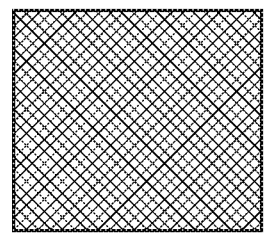

FIGS. 3A-3C are schematic views of spacers (such as spacer 38 in FIG. 2) in different embodiments for use in creating blind holes in a tank section. FIG. 3A shows a cross-section of a V-section ring spacer. The V-section ring spacer should have a CTE close to that of the composite. The shape of the V-section ring spacer allows a rigid material to flex slightly when compressed between soluble tools 32a and 32b.

FIG. 3B shows a cross section of an elastomer O-ring spacer, while FIG. 3C shows a cross section of an elastomer square ring spacer. Because of their elastomeric nature, there is no need for a particularly special shape to allow for crushing of the spacer. The elastomer spacers must have an excellent bond with the composite material to avoid breaking free during temperature cycling of the tank, due to CTE mismatch.

Figure 4:
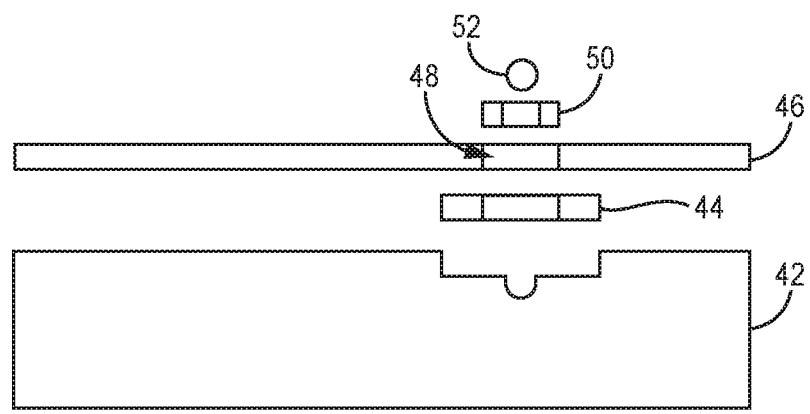
FIG. 4 is a schematic view of a tool having a reinforcement.

FIG. 4 is a schematic view of a tool having a reinforcement. FIG. 4 shows soluble tool 42, local reinforcement 44, composite material 46 with hole 48, spacer ring 50, and bearing 52. Here, local reinforcement 44 sits in an indent in soluble tool 42, reinforcing the shape of the blind hole that will be made when composite material 46 is cured. This allows for a deepened indent in soluble tool 42 in which bearing 52 can sit and align soluble tool 42 with hole 48 in composite material 46. Composite local reinforcement 44 can be made of the same or similar material as composite material 46, and can cured to spacer ring 50 and composite material 46 when the assembly is cured.

Figure 5:
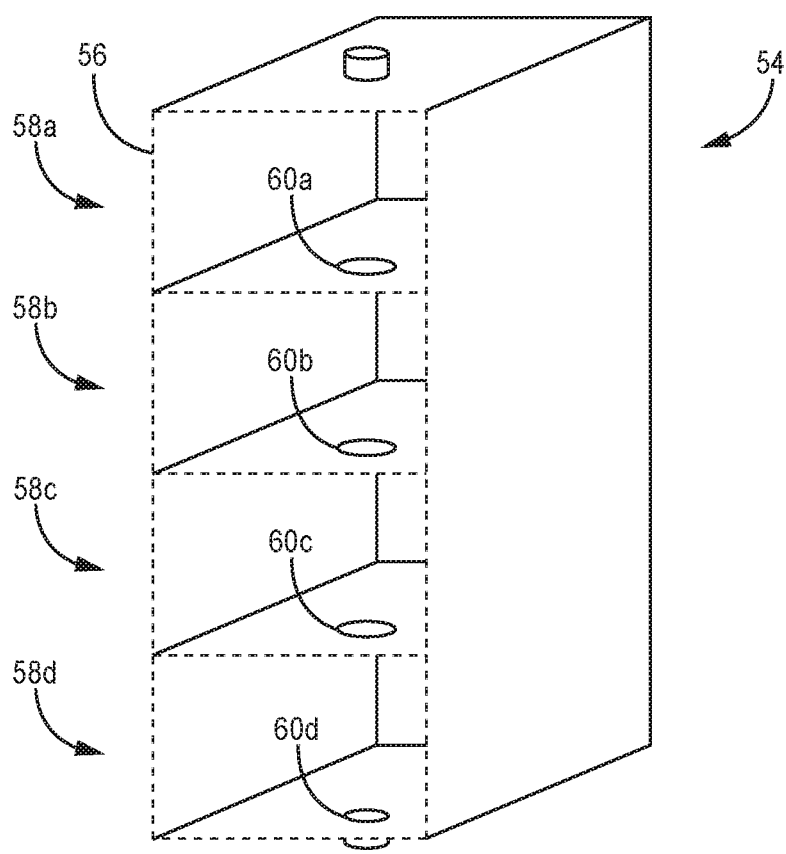
FIG. 5 is a three dimensional cutaway sketch of a full multi-section tank.

FIG. 5 is a three dimensional cutaway sketch of full multi-section tank 54. Tank 54 is cut-away at line 56 to show internal compartments 58a, 58b, 58c, 58d. Each compartment 58a, 58b, 58c, 58d has a blind hole 60a, 60b, 60c, 60d, respectively. Blind holes 60a, 60b, 60c, 60d allow for passage between compartments 58a, 58b, 58c, 58d. Tank 54 is manufactured as described in reference to FIGS. 1 and 2.

The tooling for creating a blind hole in multi-section tanks allows for a seal on blind holes without using wet sealants that can interfere with the composite cure process. Generally, any material that does not bond to the composite will be difficult to retrieve. Thus, sealing of the spacer to the composite material prevents difficult retrieval after curing. Finally, this approach prevents the use of multi-part hard tooling, which does not work for enclosed areas, such as multi-section tanks, unless secondary bonding is used during manufacture of the tank.

Discussion of Possible Embodiments

The following are non-exclusive descriptions of possible embodiments of the present invention.

A method of making a multi-section tank includes aligning two mating sections of a soluble tool, applying a composite material between the two mating sections, composite material having a hole, placing a spacer in the central hole, curing the composite material and the spacer around the soluble tool, such that the spacer adheres to the composite material, and washing out the soluble tool to form a blind hole between mating sections of the tank.

The method of the preceding paragraph can optionally include, additionally and/or alternatively, any one or more of the following features, configurations and/or additional components:

The method of the preceding paragraph can optionally include, additionally and/or alternatively, any one or more of the following features, configurations and/or additional components:

Aligning two mating sections of a soluble tool comprises applying a bearing inside the spacer and aligning the bearing with one or more indents in the two mating sections of the soluble tool.

The bearing is a ball bearing, pin, flattened disk, or cylinder.

The method includes removing the bearing after washing out the soluble tool.

The method includes applying a second section of composite material around the outside of the soluble tool prior to curing the composite material.

Curing the composite material is done in an autoclave or an oven.

Curing the composite material is done between 200 and 400 degrees Fahrenheit.

Curing the composite material is done at a pressure between vacuum and 100 psi.

Placing a spacer in the central hole comprises drawing a ring with a thick paste.

An apparatus includes a soluble tool having a first mating part with an indent and a second mating part with an indent, the second mating part aligned with the first mating part; a composite layer between the first mating part and the second mating part, the composite layer comprising a central opening; and a spacer residing in and conformed to the central opening.

The apparatus of the preceding paragraph can optionally include, additionally and/or alternatively, any one or more of the following features, configurations and/or additional components:

The apparatus includes a bearing residing in the spacer and aligned with the indents.

The bearing is selected from the group consisting of a ball, a pin, a cylinder, and a flattened disc.

The soluble tool comprises a salt or a ceramic having a water soluble polymer binding.

The composite layer comprises a pre-impregnated fabric comprising a fiber matrix and a resin.

The fiber matrix is carbon fiber, carbon nanotube fiber, or fiber glass.

The resin is a thermoplastic or a thermoset.

The spacer is a flexible ring.

The spacer is a V-section ring.

The spacer is an elastomeric ring.

The spacer is a paste.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of making a multi-section composite tank, comprising:
    aligning two mating sections of a soluble tool;
        applying a composite material between the two mating sections, the composite material having a central hole and a composite layer thickness;
        placing a spacer in the central hole, wherein the spacer is configured to ensure that the composite layer does not close around the central opening when the composite layer is cured and the spacer is further configured to have in-plane rigidity such that the spacer keeps its shape during a build of a multi-section tank, wherein the spacer has a spacer thickness that is no greater than the composite layer thickness and the spacer is formed from a material that will cure with the composite layer;
    curing the composite material and the spacer around the soluble tool, such that the spacer adheres to the composite material; and
    washing out the soluble tool to form a blind hole between mating sections of the tank.

2. The method of claim 1, wherein aligning two mating sections of a soluble tool comprises applying a bearing inside the spacer and aligning the bearing with one or more indents in the two mating sections of the soluble tool, wherein the bearing is configured to be removed after the soluble tool is washed out of the assembly and wherein the bearing has a bearing diameter that is larger than the composite layer thickness and the spacer thickness.

3. The method of claim 2, wherein the bearing is a ball bearing, pin, flattened disk, or cylinder.

4. The method of claim 2, further comprising removing the bearing after washing out the soluble tool.

5. The method of claim 1, further comprising applying a second section of composite material around the outside of the soluble tool prior to curing the composite material.

6. The method of claim 1, wherein curing the composite material is done in an oven or an autoclave.

7. The method of claim 6, wherein curing the composite material is done between 200 and 400 degrees Fahrenheit.

8. The method of claim 6, wherein curing the composite material is done at a pressure up to 100 psi.

9. The method of claim 1, wherein placing a spacer in the central hole comprises drawing a ring with a paste, wherein the paste cures before the composite layer.

10. An apparatus comprising:
    a soluble tool comprising:
        a first mating part having an indent;
        a second mating part having an indent, the second mating part aligned with the first mating part;
    a composite layer between the first mating part and the second mating part, the composite layer comprising a central opening and having a composite layer thickness; and
    a spacer in and conformed to the central opening, wherein the spacer is configured to ensure that the composite layer does not close around the central opening when the composite layer is cured and the spacer is further configured to have in-plane rigidity such that the spacer keeps its shape during a build of a multi-section tank, wherein the spacer has a spacer thickness that is no greater than the composite layer thickness and the spacer is formed from a material that will cure with the composite layer.

11. The apparatus of claim 10, further comprising a bearing residing in the spacer and aligned with the indents, wherein the bearing is configured to be removed after the soluble tool is washed out of the assembly and wherein the bearing has a bearing diameter that is larger than the composite layer thickness and the spacer thickness.

12. The apparatus of claim 11, wherein the bearing is selected from the group consisting of a ball, a pin, a cylinder, and a flattened disc.

13. The apparatus of claim 10, wherein the soluble tool comprises a salt or a ceramic having a water soluble polymer binding.

14. The apparatus of claim 10, wherein the composite layer comprises a pre-impregnated fabric comprising a fiber matrix and a resin.

15. The apparatus of claim 14, wherein the fiber matrix is carbon fiber, carbon nanotube fiber, or fiber glass.

16. The apparatus of claim 14, wherein the resin is a thermoplastic or a thermoset.

17. The apparatus of claim 10, wherein the spacer is a V-section ring.

18. The apparatus of claim 10, wherein the space is a flexible ring.

19. The apparatus of claim 18, wherein the spacer is a paste that cures before the composite layer.

* * * * *